United States Patent [19]

Nestrud

[11] Patent Number: 5,203,827
[45] Date of Patent: Apr. 20, 1993

[54] COUNTER WEIGHTED PEDAL

[75] Inventor: Thomas C. Nestrud, Barrington, Ill.

[73] Assignee: Excel International Group, Inc., Rockford, Ill.

[21] Appl. No.: 734,906

[22] Filed: Jul. 24, 1991

[51] Int. Cl.[5] .............................................. G05G 1/14
[52] U.S. Cl. ................................. 74/594.5; 74/594.4; 74/594.1
[58] Field of Search .................. 74/594.1, 594.4, 594.5

[56] References Cited

U.S. PATENT DOCUMENTS

| 543,844 | 8/1895 | Bliven | 74/594.5 O |
|---|---|---|---|
| 564,431 | 7/1896 | Lavigne | 74/594.5 O |
| 594,405 | 11/1897 | Lavigne | 74/594.5 O |
| 955,957 | 4/1910 | Francis | 74/594.4 |
| 1,070,971 | 8/1913 | Lowd | 74/594.4 |
| 3,807,255 | 4/1974 | Baginski | 74/594.4 |
| 4,411,169 | 10/1983 | Takeda | 74/594.4 |
| 4,429,950 | 2/1984 | Zwahlen | 74/594.4 |
| 4,445,397 | 5/1984 | Shimano | 74/594.4 |
| 4,825,719 | 5/1989 | Romano | 74/594.1 |

FOREIGN PATENT DOCUMENTS 0155664  9/1903  Fed. Rep. of Germany ... 74/594.5 O
0417636 12/1947  Italy .................................. 74/594.4

Primary Examiner—Leslie A. Braun
Assistant Examiner—Daniel Wittels
Attorney, Agent, or Firm—Lee, Mann, Smith, McWilliams, Sweeney & Ohlson

[57] ABSTRACT

A pedal primarily for use with an exercise cycle or similar apparatus. The pedal has a top pedaling surface and is counterweighted to retain the pedaling surface substantially in a horizontal orientation. For counterweighting, the pedal is provided with a pair of spaced clamps secured to the pedal beneath the pedaling surface, and an elongated counterweighting body is retained in the clamps. The body is prevented from axially shifting by means of a circumferential flange formed in the body which intersects a corresponding groove formed in one of the clamps. The pedal has an attachment bolt having a threaded free end and an extension located between the threaded free end and the pedal for attachment of an exercising arm.

8 Claims, 3 Drawing Sheets

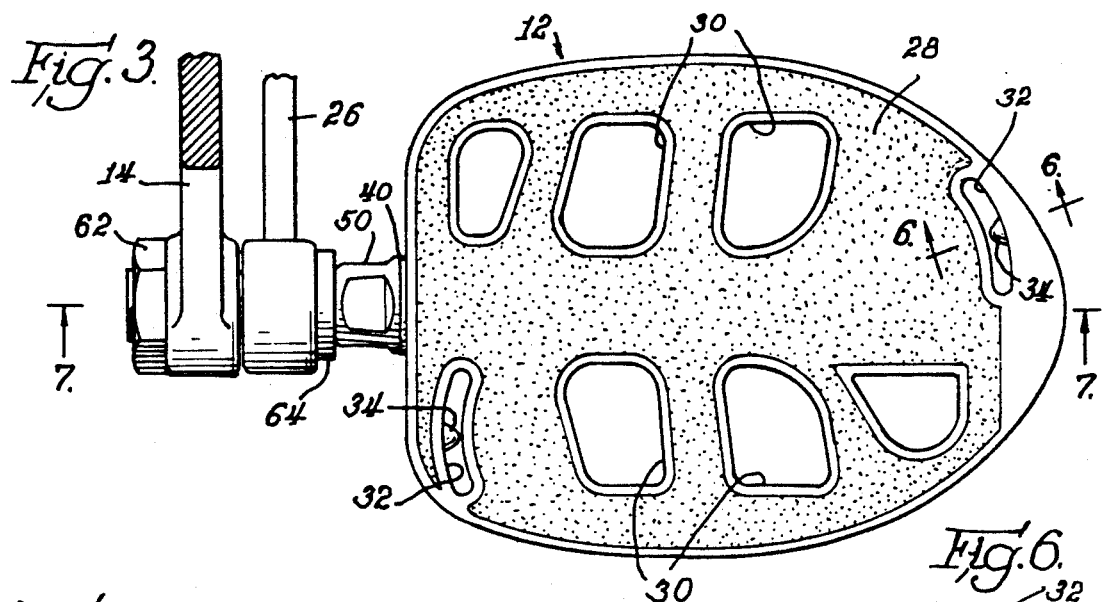
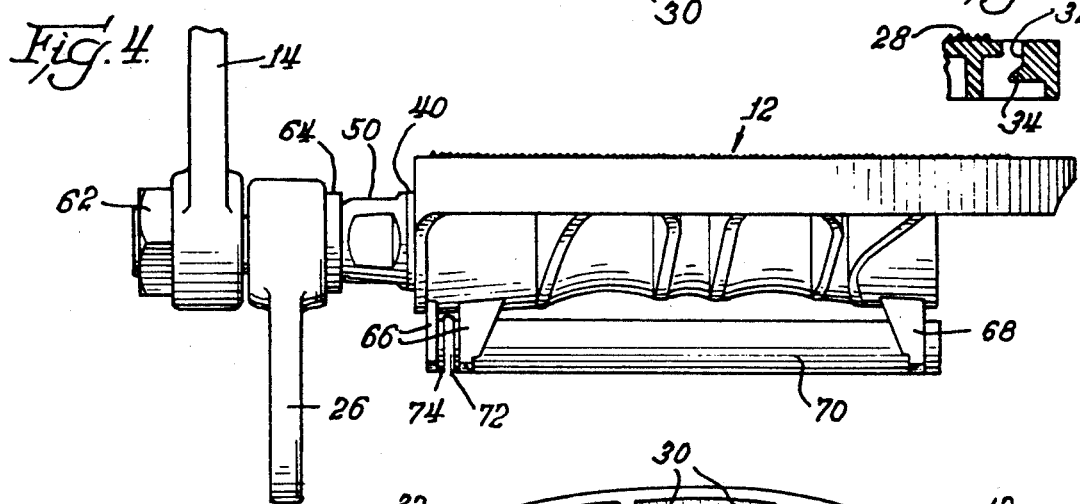
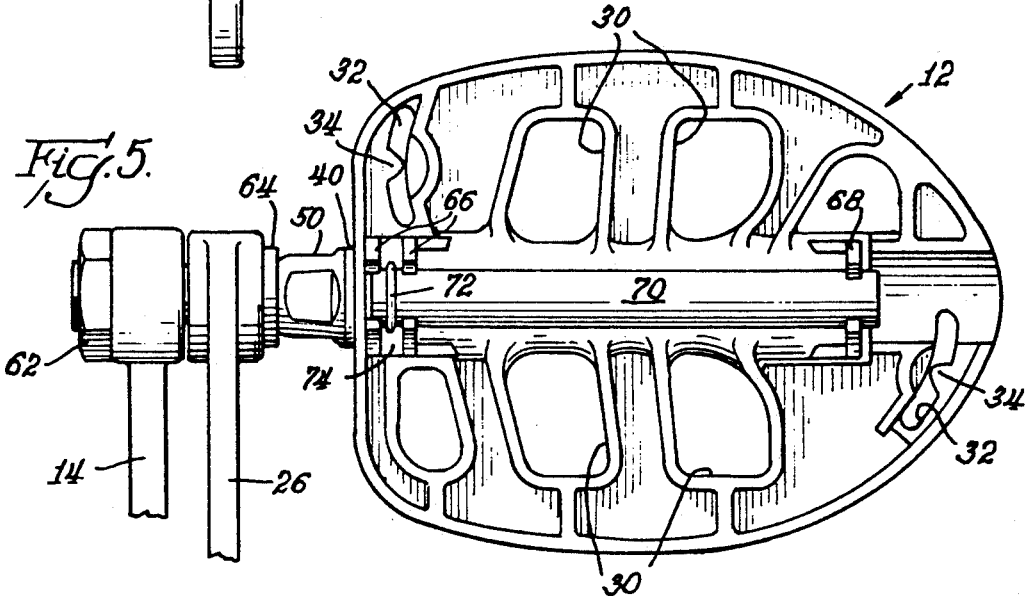

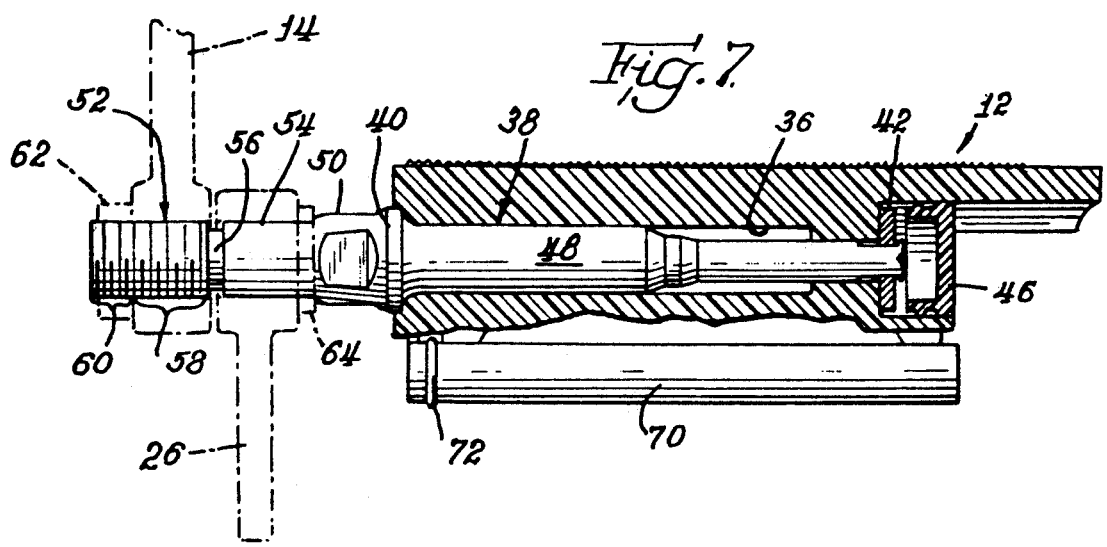
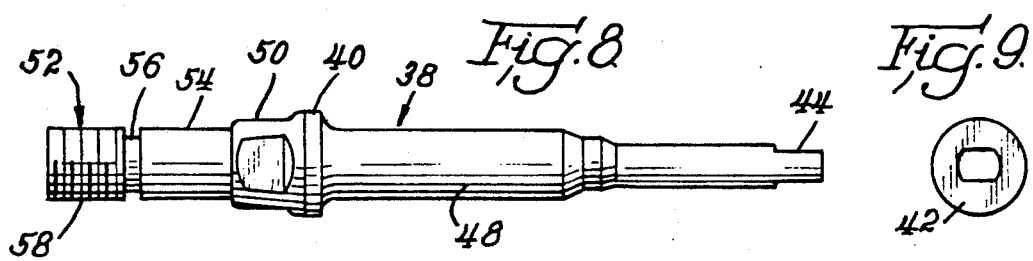
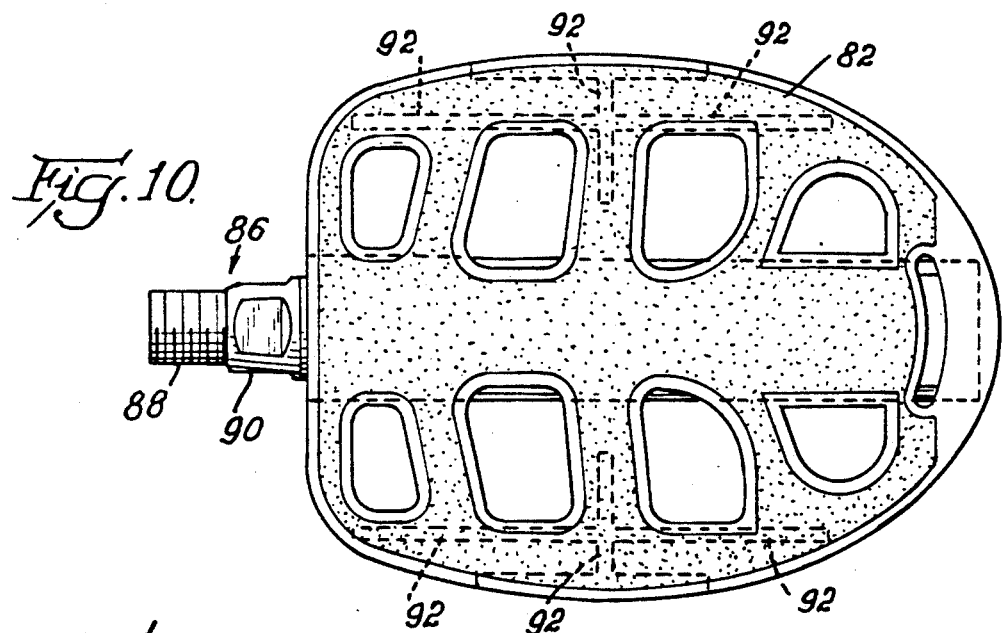
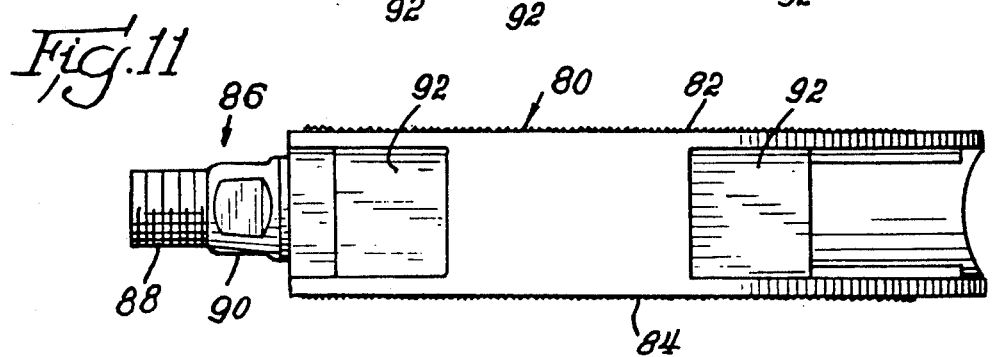

COUNTER WEIGHTED PEDAL

BACKGROUND OF THE INVENTION

This invention relates to pedals, and more particularly to a pedal for use primarily in an exercise cycle, the pedal being counterweighted to always present its pedaling surface in a horizontal orientation.

As the value of exercise becomes more apparent to more people, the development of better and more diversified exercise equipment has naturally followed. Included in that equipment are exercise cycles of increasing utility and sophistication. As any bicycle, exercise cycles are operated by the user by engaging a pair of pedals rotatably attached to crank arms on opposite sides of the cycle.

While exercise cycles normally do not experience the environmental extremes of bicycles, it is important that the pedals be properly formed and available to the exerciser during the exercise time. Furthermore, it is necessary to provide appropriate interconnection between the pedals and any arm exercising portions of the cycle, when present.

SUMMARY OF THE INVENTION

The invention provides a pedal, primarily for use with an exercise cycle, and having a top pedaling surface and means for rotatably attaching the pedal to a crank arm. Means is provided for counterweighting the pedal to retain the pedaling surface substantially in a horizontal orientation, the counterweighting means comprising a pair of spaced clamps secured to the pedal beneath the pedaling surface and an elongated counterweighting body retained in the clamps. Means is formed in the counterweighting body and in at least one of the clamps for preventing axial shifting of the counterweighting body in the clamps while the pedal is rotated.

In accordance with the preferred form of the invention, the means for preventing axial shifting of the counterweighting body comprises a groove in one of the clamps and a circumferential flange on the counterweighting body, with the flange intersecting the groove. Preferably, the groove is sufficiently deep to comprise a gap dividing the one clamp into two clamp portions.

For rotatably attaching the pedal to a crank arm, an attachment bolt is provided having a free end extending from one end of the pedal, the bolt having a shank located in a cavity in the pedal for rotation therewithin. The free end has a threaded part for engagement in a crank arm, and includes an extension located between the threaded part and the shank for attachment of auxiliary equipment, such as a crank connected to an arm exercising portion of the exercise cycle. A circumferential groove is provided between the threaded part and the extension.

In accordance with one form of the invention, the free end of the bolt includes a threaded part which comprises a first portion for engagement in a crank arm, and a second portion extending from the first portion for engagement by a nut to lock the bolt to the crank arm. The second portion is formed to extend from the crank arm when the first portion is engaged in the crank arm.

BRIEF DESCRIPTION OF THE DRAWINGS

The invention is described in greater detail in the following description of examples embodying the best mode of the invention, taken in conjunction with the drawing figures, in which:

FIG. 3 is a top plan view of the pedal area shown in FIG. 2, FIG. 4 is a side elevational view of the pedal area shown in FIG. 2 (from the left side), FIG. 5 is a bottom plan view of the pedal area shown in FIG. 2, FIG. 6 a cross sectional view taken along lines 6—6 of FIG. 3, FIG. 7 is a cross sectional view taken along lines 7—7 of FIG. 3, with the cycle mounting parts being shown in phantom, FIG. 8 is a side elevational view of a second form of pedal bolt according to the invention, FIG. 9 is an elevational view of a retainer washer for the pedal bolt of the invention, FIG. 10 a top plan view of another form of pedal according to the invention, and FIG. 11 is a side elevational view thereof.

DESCRIPTION OF EXAMPLES EMBODYING THE BEST MODE OF THE INVENTION

Figure 1:
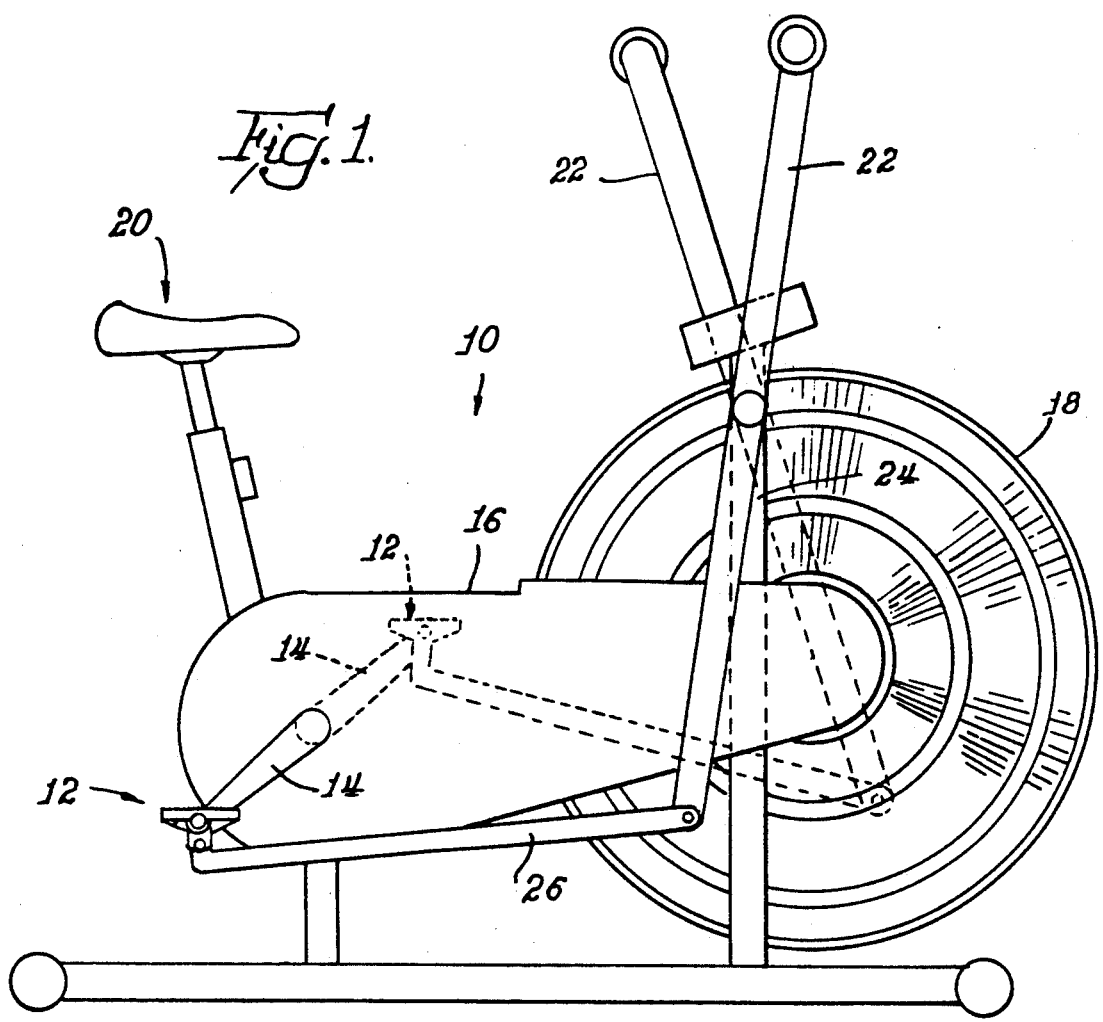
FIG. 1 is an elevational view of an exercise cycle incorporating pedals according to the invention.
Figure 2:
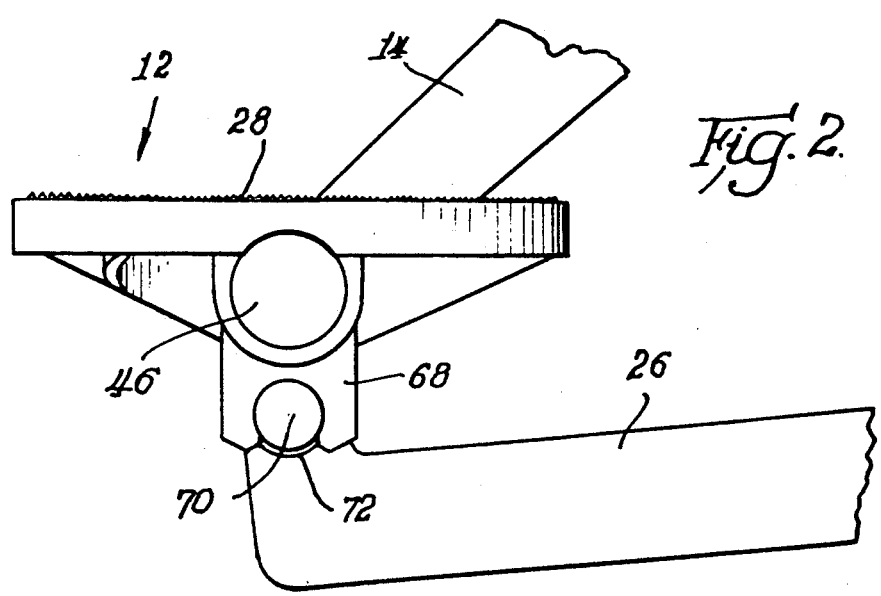
FIG. 2 is an enlarged elevational view of one pedal area of the exercise cycle shown in FIG. 1.

FIG. 1 illustrates one form of exercise cycle 10 employing pedals 12 according to the invention. The exercise cycle may be conventional, with the pedals 12 each engaged in a crank arm 14 secured to a central axle (not illustrated), which in turn is appropriately connected within a housing 16 to a resistance fan (not illustrated) located within a vented grill housing 18. By pedaling the pedals 12, the user rotates the fan, more vigorous pedaling rotating the fan at a higher rotational velocity, thus increasing the effort due to frictional air drag of the fan within the grill housing 18. All such features of the exercise cycle 10 are well known and conventional.

The exercise cycle 10 includes an adjustable seat 20 for the user, and also a pair of exercising arms 22 pivotally secured to a central pedestal 24. Each exercising arm 22 is, in turn, linked to an associated pedal 12 by means of a connecting link 26. The means of connection to a pedal is better shown in FIGS. 2-7, and is described in greater detail below.

The pedal 12 includes a top pedaling surface 28. The surface 28 may be appropriately formed with a non-slip surface to enhance the security of the user, and also may be formed with a series of apertures 30 both to lighten the pedal and also provide an aesthetically pleasing surface. If desired, strap apertures 32 can also be formed in the pedal 12 for locating toe straps (not illustrated) on the pedal 12. The strap apertures 32 each include a projecting nib 34 to hold a strap in place.

The pedal 12 is preferably molded from plastic or the like, and includes a central bore or cavity 36 for passage of and attachment of a pedal bolt 38. The pedal bolt 38 is held in place in the pedal by means of a collar 40 and a retainer washer 42 which is fitted on a retainer flat 44 formed at one end of the pedal bolt 38. When the pedal bolt 38 is installed within the cavity 36, the retainer washer 42 is applied thereto, and then the retainer flat 44 is swaged on otherwise deformed at its end to retain the washer 42 in place. Once the washer 42 is secured an end cap 46 is installed.

The pedal bolt 38 includes a shank 48 extending between the collar 40 and the retainer flat 44. The shank may or may not be reduced in diameter, as shown, in order to be accommodated within the formed cavity 36.

As is conventional, a wrench flat 50 is formed on the pedal bolt 38 for facilitating attachment of the pedal 12 to a crank arm 14. Extending beyond the wrench flat 50 is a free end of the pedal bolt 38, comprising a threaded part 52 and an extension 54, with a circumferential groove 56 formed therebetween.

The threaded part 52 is divided into two portions, a first portion 58 for engagement in the crank arm 14, and a second portion 60 which extends from the first portion 58 for engagement by a nut 62 to lock the bolt 38 to the crank arm 14. The portions 58 and 60 may be of the same diameter, as shown in FIG. 7, or the portion 60 may be of a somewhat smaller diameter to easily pass through the crank arm 14.

The extension 54 is employed for attachment of the connecting link 26 to the pedal 12. As shown in FIGS. 2-7, the link 26 includes a central bore through which the pedal bolt 38 passes. To reduce friction, a flange bushing 64 is installed about the extension 54 within the bore in the link 26.

The pedal 12 is counterweighted. As shown in FIGS. 4, 5 and 7, the pedal 12 includes a pair of spaced clamps 66 and 68, preferably integrally formed therewith, extending beneath the pedaling surface 28. An elongated counterweighting body 70 is snapped into, and retained within, the clamps 66 and 68. To prevent axial shifting of the counterweighting body 70, the counterweighting body includes a circumferential flange 72 engaging a groove 74 formed in the clamp 66. The groove 74 is sufficiently deep as to create a gap dividing the clamp 66 into two clamp portions. The clamp portions of the clamp 66 are shaped to closely fit about the counterweighting body 70, and therefore the flange 72 prevents the counterweighting body 70 from shifting axially and inadvertently becoming disengaged from the clamps 66 and 68.

The pedal bolt 38 illustrated in FIG. 8 differs very slightly from that illustrated in FIG. 7. The pedal bolt 38 in FIG. 8 includes a threaded part 52 having only the first thread portion 58, with the extended second thread portion 60 being omitted. Otherwise, the pedal bolt 38 shown in FIG. 8 is identical.

FIGS. 10 and 11 show a form of non-counterweighted pedal 80 having opposite pedaling surfaces 82 and 84. A pedal bolt 86 is installed in the pedal 80 in the same manner as the pedal bolt 38 is installed in the pedal 12. In this form of the invention, a threaded part 88 extends in the pedal bolt 86 from immediately adjacent a wrench flat 90. Alternatively, as needs dictate, the pedal bolts 38 of FIGS. 7 or 8 can be employed in place of the pedal bolt 86.

The pedal 80 of FIGS. 10 and 11 is relatively thick, and in order to reduce weight, the pedal is substantially hollow. The pedaling surfaces 82 and 84 are apertured both to reduce weight and for aesthetic purposes, and a series of interconnecting strengthening ribs 92 are employed to give the pedal 80 structural integrity.

Various changes can be made to the invention without departing from the spirit thereof or scope of the following claims.

What is claimed is:

1. A pedal comprising
   (a) a top pedaling surface,
   (b) means for rotatably attaching the pedal to a crank arm, and
   (c) means counterweighting the pedal to retain the pedaling surface substantially in a horizontal orientation, said counterweighting means being located beneath said means for rotatably attaching and comprising
      (i) a pair of spaced clamps secured to the pedal beneath the pedaling surface, each clamp comprising a pair of clamp arms,
      (ii) an elongated, generally cylindrical counterweighting body circumferentially retained in said clamps, and
      (iii) means formed in said counterweighting body and in at least one of said clamps for preventing axial shifting of said counterweighting body in said clamps, said means for preventing shifting comprising a groove in said one clamp forming a gap in each clamp arm of said one clamp and a circumferential flange on said counterweighting body intersecting said gaps.

2. A pedal according to claim 1 in which said means for rotatably attaching comprises an attachment bolt having a free end extending from one end of the pedal, said bolt having a shank located in a cavity in the pedal for rotation therewithin.

3. A pedal according to claim 2 in which said free end has a threaded part for engagement in a crank arm, and including an extension located between said threaded part and said shank.

4. A pedal according to claim 3 including a circumferential groove between said threaded part and said extension.

5. A pedal according to claim 2 in which said free end includes a threaded part comprising a first portion for engagement in a crank arm and a second portion extending from the first portion for engagement by a nut to lock said bolt to a crank arm.

6. A pedal comprising
   (a) a top pedaling surface,
   (b) an attachment bolt for rotatably attaching the pedal to a crank arm, said bolt having a free end extending from one end of the pedal and a shank located in a cavity in the pedal for rotation therewithin, the free end having a threaded part for engagement in the crank arm and having an extension located between said threaded part and said shank, and
   (c) means counterweighting the pedal to retain the pedaling surface substantially in a horizontal orientation, said counterweighting means being located beneath said attachment bolt and comprising
      (i) a pair of spaced clamps secured to the pedal beneath the pedaling surface, each clamp comprising a pair of clamp arms,
      (ii) an elongated, generally cylindrical counterweighting body circumferentially retained in said clamps, and
      (iii) means for preventing axial shifting of said counterweighting body, comprising a groove in one of said clamps forming a gap in each clamp arm of said one clamp and a circumferential flange on said counterweighting body, said flange intersecting said gaps.

7. A pedal according to claim 6 including a circumferential groove between said threaded part and said extension.

8. A pedal according to claim 6 in which said free end includes a threaded part comprising a first portion for engagement in a crank arm and a second portion extending from the first portion for engagement by a nut to lock said bolt to a crank arm.

* * * * *